United States Patent
Sato et al.

(10) Patent No.: US 7,988,365 B2
(45) Date of Patent: Aug. 2, 2011

(54) CAGE FOR A BEARING ASSEMBLY

(75) Inventors: Norihide Sato, Kuwana (JP); Tomoya Sakaguchi, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/224,801

(22) PCT Filed: Feb. 16, 2007

(86) PCT No.: PCT/JP2007/000092
§ 371 (c)(1),
(2), (4) Date: Sep. 5, 2008

(87) PCT Pub. No.: WO2007/105354
PCT Pub. Date: Sep. 20, 2007

(65) Prior Publication Data
US 2009/0067769 A1  Mar. 12, 2009

(30) Foreign Application Priority Data

Mar. 6, 2006 (JP) ................................. 2006-059105
Jan. 29, 2007 (JP) ................................. 2007-017357

(51) Int. Cl.
*F16C 33/38* (2006.01)
(52) U.S. Cl. ........................ 384/523; 384/530
(58) Field of Classification Search .......... 384/523, 384/526, 527, 528, 529, 530, 531, 533, 534, 384/532
See application file for complete search history.

(56) References Cited

U.S. PATENT DOCUMENTS

| | | | |
|---|---|---|---|
| 3,141,711 A * | 7/1964 | Biedinger | 384/533 |
| 3,313,582 A * | 4/1967 | Hubbell | 384/530 |
| 6,692,156 B1 * | 2/2004 | Ohura et al. | 384/523 |
| 6,719,459 B1 * | 4/2004 | Gotoh | 384/482 |

FOREIGN PATENT DOCUMENTS

| | | |
|---|---|---|
| JP | 39-27004 | 9/1964 |
| JP | 41-6726 | 4/1966 |
| JP | 2001-304268 | 10/2001 |
| JP | 2001304268 A * | 10/2001 |
| JP | 2002-339980 | 11/2002 |
| JP | 2003-343567 | 12/2003 |
| JP | 2004-76778 | 3/2004 |
| JP | 2005-69404 | 3/2005 |
| JP | 2005-308117 | 11/2005 |
| JP | 2006-322564 | 11/2006 |

OTHER PUBLICATIONS

International Preliminary Report on Patentability mailed on Sep. 18, 2008 and issued in corresponding International Patent Application No. PCT/JP2007/000092. Chinese Office Action issued in corresponding Chinese Patent Application 200780008244.2.
First Chinese Office Action issued in corresponding Chinese Patent Application 200780008244.2.
Second Chinese Office Action issued in corresponding Chinese Patent Application 200780008244.2.
Third Office Action issued in corresponding Chinese Patent Application 200780008244.2.
International Search Report of International Application No. PCT/JP2007/000092 (mailed May 22, 2007).

* cited by examiner

*Primary Examiner* — Thomas R Hannon
*Assistant Examiner* — Phillip A Johnson

(57) ABSTRACT

A cage used in a ball bearing assembly is rendered to be of a ring shape having a plurality of pockets defined therein to hold a corresponding number of balls in a circumferential row. The radius of a bore of a circumferentially extending body of the cage as measured from the geometric center of the bore to an inner peripheral surface area of the circumferentially extending body aligned with each of the pockets is chosen to be greater than the radius as measured from the geometric center of the bore to a different inner peripheral surface area of the circumferentially extending body intermediate between the neighboring pockets.

12 Claims, 5 Drawing Sheets

Prior Art

Prior Art

CAGE FOR A BEARING ASSEMBLY

CROSS REFERENCE TO RELATED PATENT APPLICATIONS

This application claims the benefit under 35 U.S.C. Section 371 of International Application No. PCT/JP2007/000092, filed Feb. 16, 2007, which claimed priority to Japanese Application No. 2006-059105, filed Mar. 6, 2006, and Japanese Application No. 2007-017357, filed Jan. 29, 2007, in the Japanese Patent Office, the disclosures of which are hereby incorporated by reference.

BACKGROUND OF THE INVENTION

The present invention generally relates to a cage for a sealed ball bearing assembly that is used in a rotary support in various rotating machines and equipments and, more particularly, to the art of preventing a lubricant grease, filled inside the ball bearing assembly, from leaking to the outside.

DESCRIPTION OF THE PRIOR ART

A ball bearing assembly used in various rotating machines and equipments and, particularly, those used in automobile auxiliary machines is generally required to have a high temperature resistance, a high speed ruggedness, a resistance to muddy water, a resistance to dusts, a capability of preventing a grease leakage, a long operating life and a low torque. To provide the ball bearing assembly with some of those characteristics, particularly the resistances to muddy water and dusts, attempts have generally been carried out to employ contact sealing members between outer and inner races of the ball bearing assembly to shield the inside of the ball bearing assembly from the outside. By way of example, the contact sealing members having respective sealing lips are fitted to an inner peripheral surface of the outer race with the sealing lips slidingly engaged in associated inner race sealing grooves defined in an outer peripheral surface of the inner race.

In the ball bearing assembly of a type provided with the contact sealing members, if the bearing temperature increases while the grease drifts in and proximate to the sealing lips of the contact sealing members, the pressure inside the bearing assembly increases by the effect of thermal expansion of the air inside the bearing assembly with a pressure difference consequently developed between the inside and outside of the bearing assembly. Due to this pressure difference, a phenomenon (which is hereinafter referred to as "breathing") tends to occur, in which the sealing lips "open", i.e., disengage from the sealing grooves to allow the grease and/or air to leak to the outside of the beating assembly.

In view of the above, attempts have been made to increase a force of urging the sealing lips into the respective inner race sealing grooves (which force is hereinafter referred to as an "urging force") to substantially eliminate the breathing phenomenon. However, this method is still incapable of avoiding the leakage of grease particularly when the temperature increases considerably to a value which would result in an inner pressure higher than the urging force. Also, since this method makes use of the high urging force to be applied to the sealing lips, a problem tends to occur that the torque will increase. As disclosed in the Patent Document 1 mentioned below, in the even that the bearing temperature lowers, the pressure inside the bearing assembly is reduced as a result of constriction of air inside the bearing assembly enough to invite a phenomenon of adherence of respective tips of the sealing lips, which phenomenon may lead to a further increase of the torque.

In order to avoid the adhering phenomenon discussed above, it has been suggested to form a vent cutout in a portion of each of the sealing lips. (See, for example, the Patent Document 2 mentioned below.) However, in the event that only air leaks from the vent cutout during the operation of the bearing assembly, the leakage of the grease may be reduced, but as discussed in the Patent Document 2, the leakage of the grease similar to that discussed above will occur, even though the vent cutout is employed, particularly when the grease adheres to the vent cutout.

[Patent Document 1] JP Laid-open Patent Publication No. 2005-069404

[Patent Document 2] JP Laid-open Patent Publication No. 2005-308117

As hereinabove discussed, as a method for handling the grease leakage, a method in which the vent cutout is formed in a portion of each sealing lip and a method in which the urging force of the sealing lips is increased, are available, but the possibility of the grease leaking will increase particularly when the grease exists in the inner sealing grooves and inner race shoulder portions as a result of rotation. Specifically, in the case where the outer race rotates, the grease once adhering to the inner sealing grooves remains adhering thereto because no centrifugal force acts on the inner race. If the bearing temperature increases during this condition, the grease leakage may occur due to the breathing phenomenon.

SUMMARY OF THE INVENTION

In view of the foregoing, an object of the present invention is to provide a ball bearing assembly of a type provided with sealing plates between an outer race and an inner race for sealing the inside of the bearing assembly from the outside of the bearing assembly and having the lubricant grease filled inside the bearing assembly, which is so designed as to prevent the grease from adhering to the inner race sealing grooves and the inner race shoulder portion to thereby avoid a possible leakage of the grease without the torque being increased.

A ring-shaped cage for use in a ball bearing assembly in accordance with the present invention is of a type, which includes a circumferentially extending body forming a bore defined therein and having inner and outer peripheral surfaces opposite to each other and also having a plurality of pockets defined therein for holding a corresponding number of balls. The ring-shaped cage is characterized in that the radius of the bore measured from the geometric center of the bore to an inner peripheral surface area of the circumferentially extending body aligned with each of the pockets is chosen to be greater than the radius measured from the geometric center of the bore to a different inner peripheral surface area of the circumferentially extending body intermediate between the neighboring pockets. The inner peripheral surface area of the circumferentially extending body aligned with each of the pockets may be either of a curved shape representing a concave line when viewed from an axial direction, or of a partial polygonal shape having a plurality of angled portions when viewed from an axial direction. The polygonal shape referred to above may be, for example, a part of the regular polygon.

When the radius of the bore measured from the geometric center of the bore to the inner peripheral surface area of the circumferentially extending body aligned with each of the pockets is made greater than the radius measured from the geometric center of the bore to the different inner peripheral surface area of the circumferentially extending body intermediate between the neighboring pockets, the grease will hardly adhere to the inner race sealing grooves and the inner race shoulder portions. This characteristically occurs particularly when the outer race rotates. Accordingly, whichever the sealing members are of a contact type or a non-contact type, the leakage of the grease can be avoided. Also, since there is no need to increase the urging force of the sealing lips, the torque will not increase. Whichever the inner peripheral surface area of the circumferentially extending body aligned with each of the pockets is of the curved shape or of the polygonal shape, effects similar to those described above can be obtained.

In the cage for the ball bearing assembly in accordance with the present invention, the inner peripheral surface area of the circumferentially extending body aligned with each of the pockets is inclined such that a circumferential intermediate portion of that inner peripheral surface area has a radius larger than the rest of that the inner peripheral surface area.

When so constructed, the radius of the bore measured from the geometric center of the bore to the inner peripheral surface area of the circumferentially extending body aligned with each of the pockets can smoothly be increased to a value greater than the radius measured from the geometric center of the bore to the different inner peripheral surface area of the circumferentially extending body intermediate between the neighboring pockets, without reducing the strength as a whole.

The cage for the ball bearing assembly in accordance with the present invention includes two annular members coaxially joinable together in an axial direction. Each of the annular members has a plurality of pocket defining wall areas of a substantially semicircular configuration that define respective parts of the pockets and are spaced a predetermined distance from each other in a direction circumferentially thereof, and generally flat bridge areas alternating with the pocket defining wall areas and each connecting the neighboring pocket defining wall areas together. The annular members are jointed together with the bridge areas of those annular members being connected together in overlapped relation to each other. Each of the annular members may be either made of a resinous material or be prepared from a steel plate.

When the cage is so constructed as hereinabove described, the machining of the cage can be facilitated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

Figure 1:
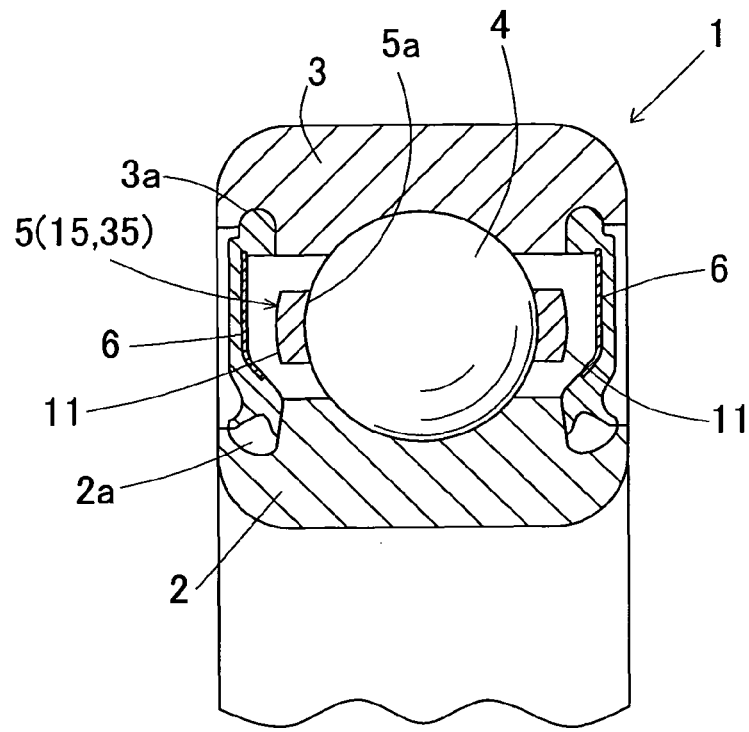
FIG. 1 is a sectional view showing a ball bearing assembly having a cage in accordance with a preferred embodiment of the present invention.

REFERENCE NUMERALS 1 ball bearing assembly
2 inner race
3 outer race
4 ball
5, 15, 25, 35 cage
5a pocket
5b inner peripheral surface area
6 sealing plate
11 annular member
11a wall area
11b flat bridge area
Ri radius as measured from the geometric center of the bore of the cage to each of the radially inwardly convexed inner peripheral surface areas which lies intermediate between the neighboring concaved inner peripheral surface areas
Rp radius as measured from the geometric center of the bore of the cage to each of the outwardly concaved inner peripheral surface areas in alignment with the respective pocket

DESCRIPTION OF THE PREFERRED EMBODIMENT

Figure 2:
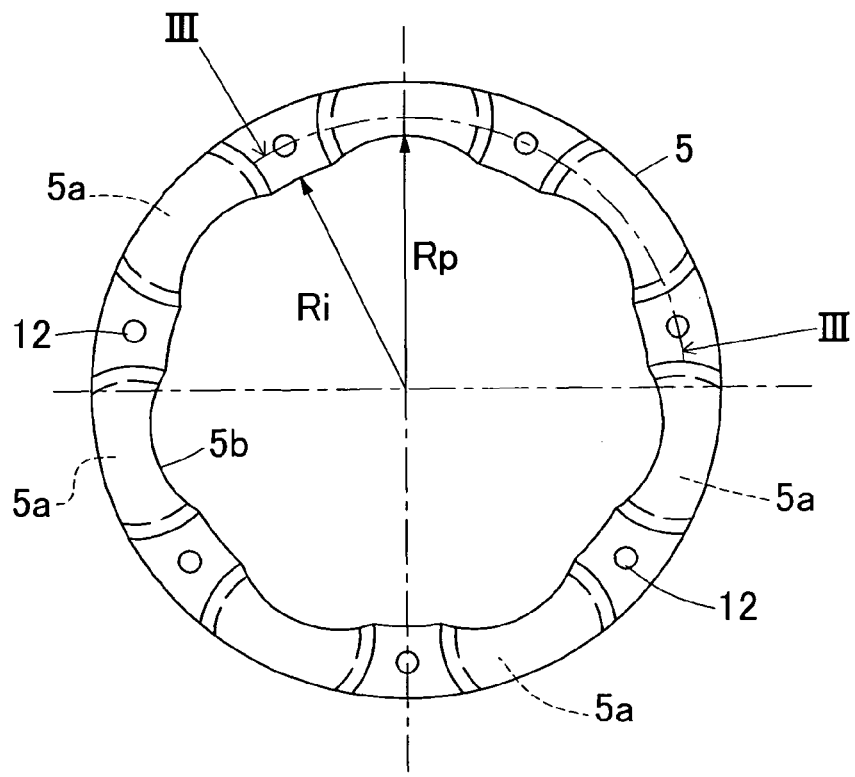
FIG. 2 is a front elevational view of the cage.
Figure 3:
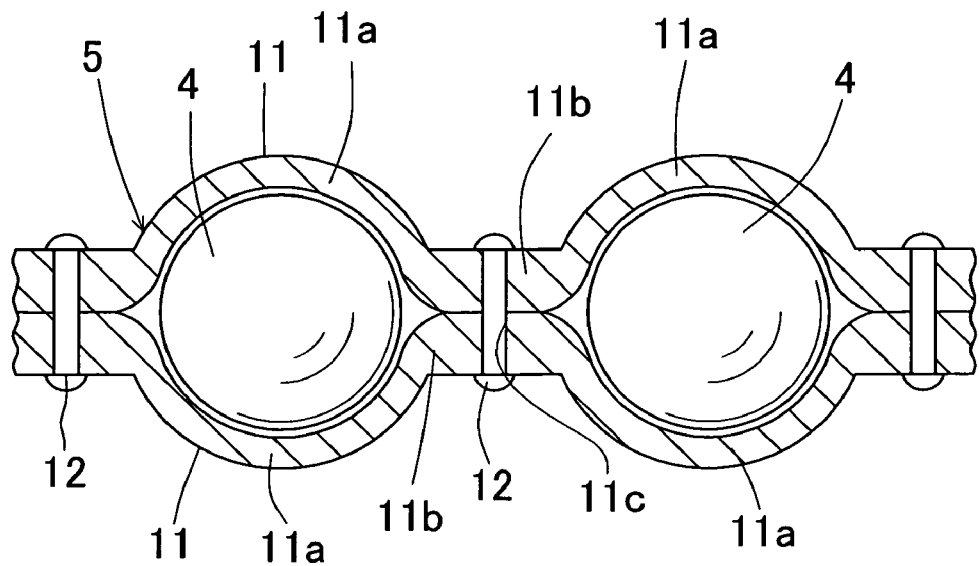
FIG. 3 is a cross-sectional view taken along the line III-III in FIG. 2.

A first preferred embodiment of the present invention will be described with particular reference to FIGS. 1 to 3. FIG. 1 illustrates a ball bearing assembly, in which a cage of the present invention is incorporated, and FIGS. 2 and 3 illustrate the cage. The ball bearing assembly 1 shown in FIG. 1 is in the form of a deep groove ball bearing and includes an inner race 2, an outer race 3, a plurality of balls 4 interposed between the inner race 2 and the outer race 3, and a cage 5 rollingly retaining the balls 4 in a circular row. An annular bearing space delimited between an outer periphery of the inner race 2 and an inner periphery of the outer race 3 has its opposite open ends each closed by an annular sealing plate 6. The annular sealing plate 6 disposed at each open end of the annular bearing space has an outer peripheral edge engaged in an outer race sealing groove 3a, defined in an inner peripheral surface of the outer race 3, and an inner peripheral edge in an inner race sealing groove 2a defined in an outer peripheral surface of the inner race 2, and forms a contact seal slidable relative to the inner race 2. A lubricant grease is filled within the annular bearing space so closed by the annular sealing plates 6.

As best shown in FIG. 2, the cage 5 is a ring-shaped member forming a bore defined therein and has window-like pockets 5a formed therein for rollingly accommodating the respective balls 4, which pockets 5a are employed in a number equal to the number of the balls 4 and are spaced an equal distance from each other in a direction circumferentially thereof. A circumferentially extending body of the cage 5 has an inner peripheral surface which is generally corrugated so as to leave radially outwardly concaved inner peripheral surface areas 5b, aligned with the respective pockets 5a, and radially inwardly convexed inner peripheral surface areas alternating with those inner peripheral surface areas 5b and each of which convexed inner peripheral surface areas is positioned intermediate between the neighboring concaved inner peripheral surface areas 5b. Specifically, these inner peripheral surface areas 5b are so radially outwardly concaved or inclined to render the radius Rp, as measured between the geometric center of the bore of the cage 5, which is in alignment with the longitudinal axis of the ball bearing 4, and each of the outwardly concaved inner peripheral surface areas 5b in alignment with the respective pocket 5a to be greater than the radius Ri as measured between the geometric center of the bore of the cage 5 and each of the radially inwardly convexed inner peripheral surface areas which lies intermediate between the neighboring concaved inner peripheral surface areas 5b. (Hence, Rp>Ri.) In the illustrated embodiment, each of the concaved inner peripheral surface areas 5b of the cage 5, when viewed from a direction parallel to the longitudinal axis of the ball bearing assembly, represents a curved shape depicting a concaved line and, more particularly, represents a substantially arcuate surface, such that a circumferentially intermediate portion of the outwardly concaved inner peripheral surface area 5b has a radius larger than the rest of that surface area 5b.

The cage 5 of the kind discussed above includes of two annular members 11 formed by stamping and molding a steel plate by the use of any known press. Each of these annular members 11 has a plurality of pocket defining wall areas 11a of a substantially semicircular configuration. The wall areas 11a define respective parts of the pockets 5a and are spaced a predetermined distance from each other in a direction circumferentially thereof. Each of the annular members 11 further has generally flat bridge areas 11b alternating with the pocket defining wall areas 11a and each connecting the neighboring pocket defining wall areas 11a together. Each of the bridge areas 11b of the respective annular member 11 prepared from a steel plate has a rivet receiving hole 11c defined therein. The two annular members 11 are riveted together in an overlapped relation by means of respective pins 12 each having been passed through the mutually aligned rivet receiving holes 11c in those two annular members 11 with their free ends hammered. Thus, when the two annular members 11 are connected together to define the single cage 5, the cage 5 can easily be manufactured even though the cage 5 of the present invention has the inner peripheral surface generally corrugated to have different radii as defined above from the geometric center of the cage 5.

Figure 8:
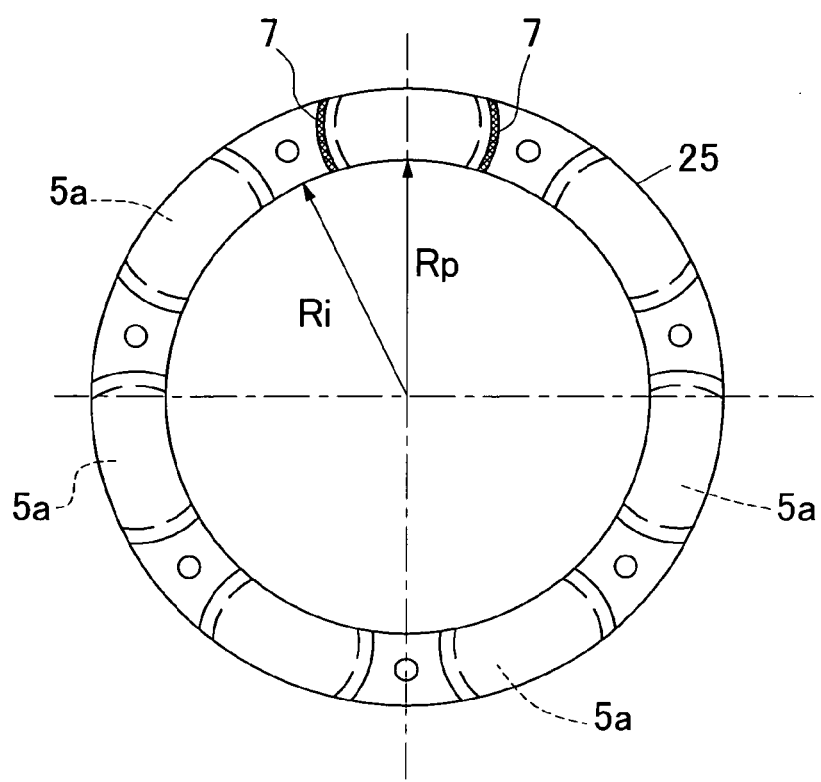
FIG. 8 is a front elevational view of the conventional cage.

Since the cage 5 of the present invention has the inner peripheral surface so corrugated as to leave the radially outwardly concaved inner peripheral surface areas 5b, and the radially inwardly convexed inner peripheral surface areas alternating with those inner peripheral surface areas 5b, it may be suspected that the cage 5 as a whole may have a reduced strength. However, it is empirically understood that most of impairments of the conventional cage 25 of the standard shape such as shown in FIG. 8, in which the radius Rp is equal to the radius Ri, tend to occur at R portions 7 each extending from a circumferential portion between the neighboring pockets 5a to a circumferential portion where the pocket 5a exist. In contrast thereto, since the cage 5 now under discussion in connection with the preferred embodiment of the present invention has no change in shape made at those portions, it may safely be said that no reduction occur in strength of the cage as a whole.

Figure 4:
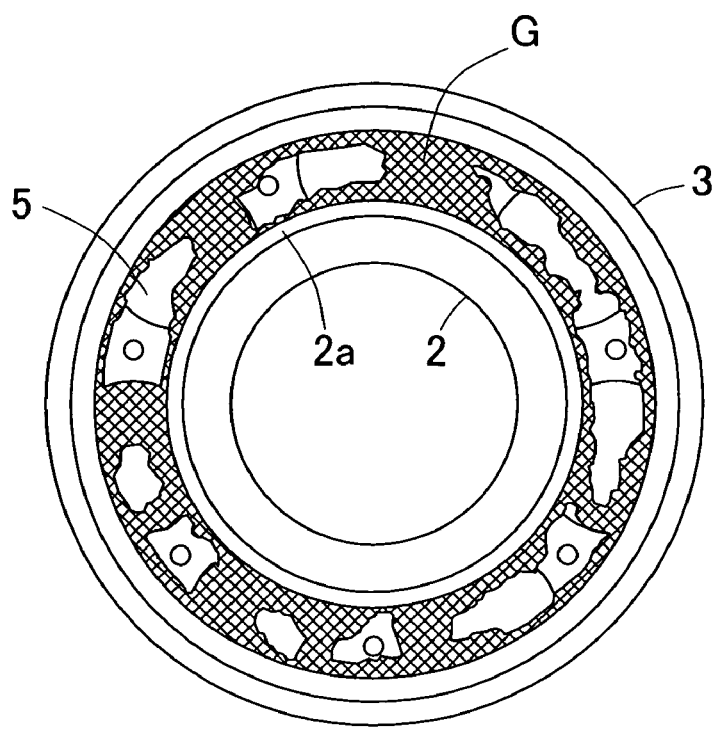
FIG. 4 illustrates a result of experiment conducted on the ball bearing assembly having the cage incorporated therein.

In order to examine the condition of the lubricant grease during the operation of the ball bearing assembly 1, a series of experiments were conducted under such condition as shown in Table 1 below. Status of adherence of the grease to various parts of the ball bearing assembly 1, when and after the latter was halted, were found to be such as shown in FIG. 4. For comparison purpose, a series of similar experiments were conducted on the conventional cage 25 of the structure shown in FIG. 8 under the same condition. The status of adherence of the grease to various parts, when and after the latter was halted, was found to be such as shown in FIG. 9.

TABLE 1

| Bearing Assembly & Number: | 6203 |
| Seal: | Not used |
| Rotatable Race: | Outer Race |
| Rotational Speed, $min^{-1}$: | 3,600 |
| Axial Load, N: | 36 |
| Running Time, s: | 5 |
| Amount of Grease Filled, mg: | 900 |
| Grease Consistency: | 250 |

Figure 9:
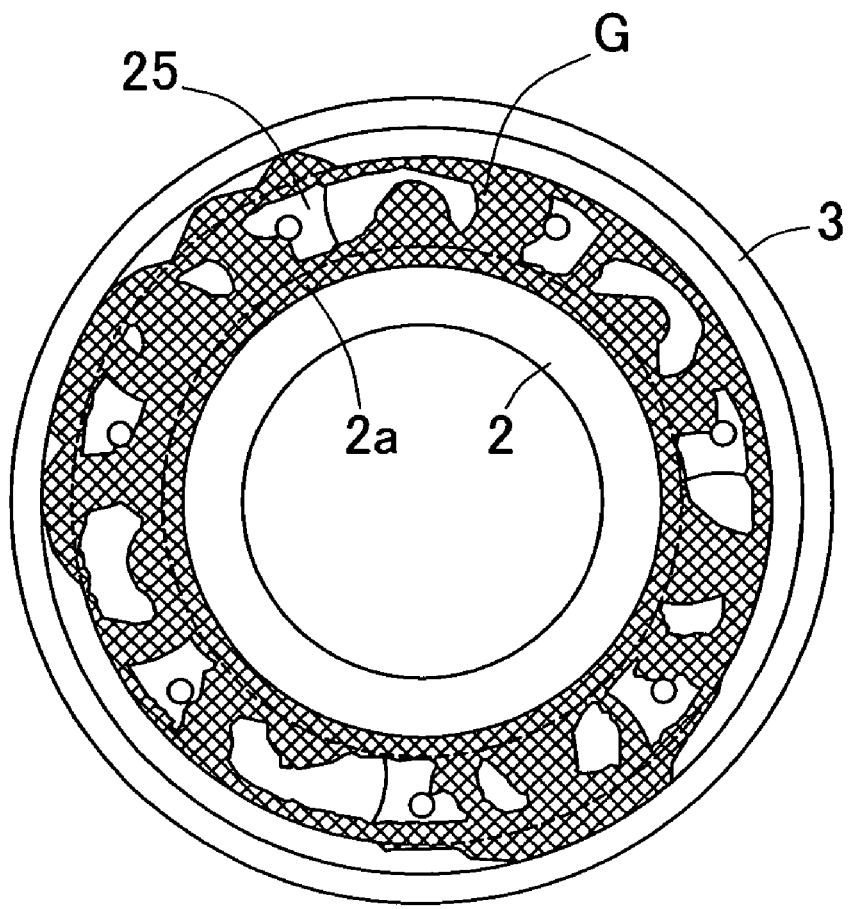
FIG. 9 illustrates a result of experiment conducted on the ball bearing assembly having the conventional cage incorporated therein.

According to the series of experiments conducted, although the grease G adheres to the inner race sealing grooves 2a in the case of the ball bearing assembly having the conventional cage 25 of FIG. 9 incorporated therein, the ball bearing assembly having the cage 5 of FIG. 4 in accordance with the present invention incorporated therein has exhibited that no grease G adhered to the inner race sealing grooves 2a. For this reason, in the ball bearing assembly 1 provided with the annular sealing plates 6 as shown in FIG. 1, it can be deduced that leakage of the grease G from the inner race sealing grooves 2a due to the breathing referred to hereinbefore can be avoided effectively.

With the use of bearing assemblies each having contact type sealing members (tradenamed "LU Seal" manufactured by and available from NTN Corporation of Japan) incorporated therein, another series of experiments were also conducted under a condition, in which only the running time referred to in the Table 1 above was changed to 15 minutes, to ascertain the frequency of leakage of the grease. In the event that about 30 to 100 mg of grease runs off from the bearing assembly to the outside thereof, such bearing assembly is rated as involving the grease leakage. Results of those experiments are tabulated in Table 2 below:

TABLE 2

| Cage | Nos. of Cages Resulting in Grease Leakage |
|---|---|
| Conventional | 9 cages out of 10 cages |
| Invention | 0 cage out of 10 cages |

Out of the 10 bearing assemblies each having the conventional cage 25 incorporated therein, 9 bearing assemblies were found involving the grease leakage, but out of the 10 bearing assemblies each having the cage 25 of the present invention incorporated therein, none of them was found involving any grease leakage. In view of this, it has been ascertained that the deduction described above was accurate and correct.

Figure 5:
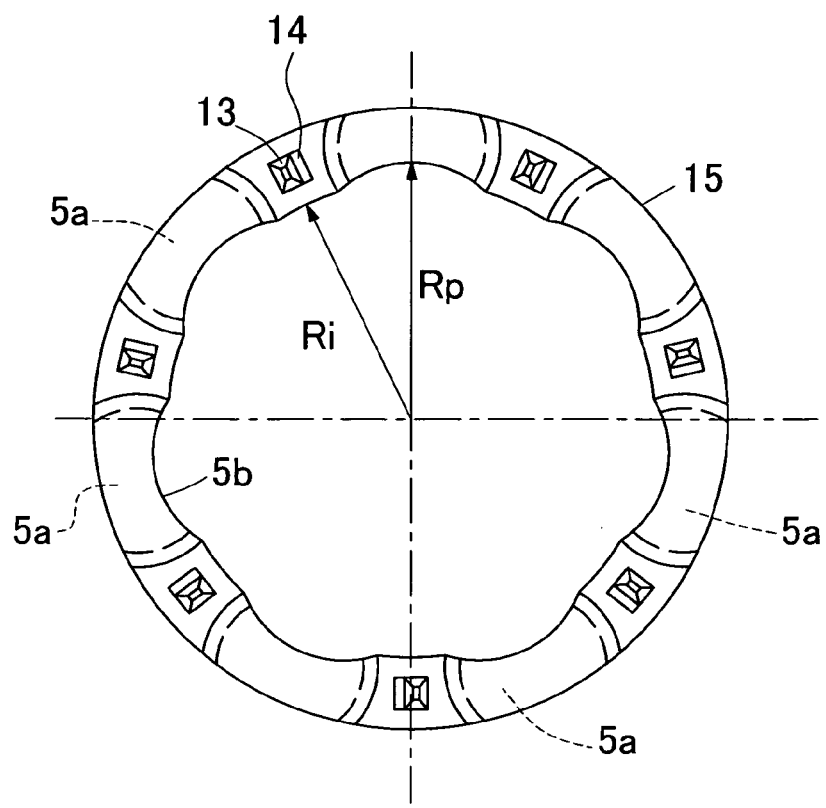
FIG. 5 is a front elevational view showing the cage of a different structure.
Figure 6:
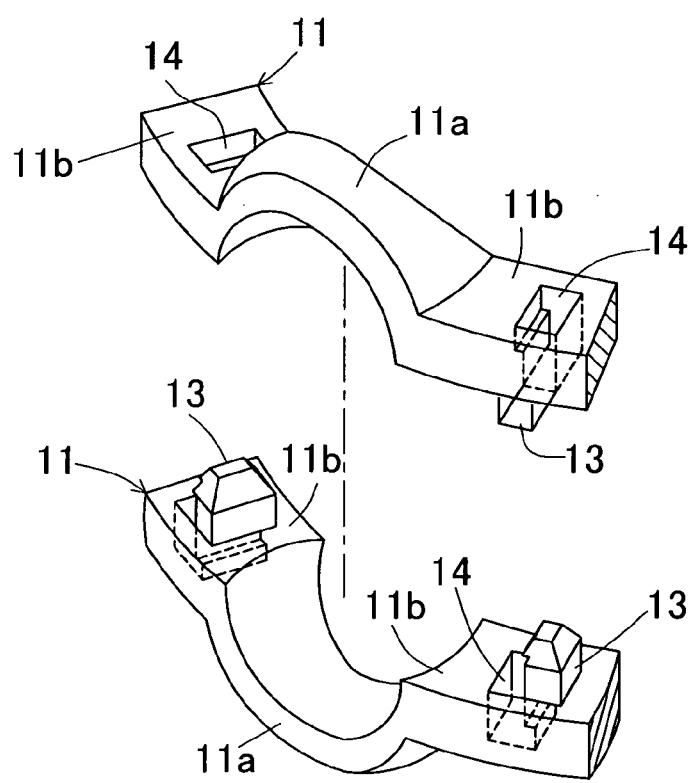
FIG. 6 is a perspective view showing an important portion of annular members of the annular cage.

It is to be noted that each of the annular members 11 forming respective parts of the cage 5 may be made of a resinous material. In such case, as represented by the cage 15 shown in FIGS. 5 and 6, the respective bridge areas 11b of those annular members 11 may be provided with engagement pawls 13 and mating engagement holes 14, which pawls 13 can be snapped respectively into the mating engagement holes 14 to joint the annular members 11 together to thereby complete the cage 15. Even in this cage 15 so assembled, the radius Rp between the geometric center of the bore of the cage 15 and each of the outwardly concaved inner peripheral surface areas 5b in alignment with the respective pocket 5a is similarly chosen to be greater than the radius Ri between the geometric center of the bore of the cage 15 and each of the radially inwardly convexed inner peripheral surface areas which lies intermediate between the neighboring concaved inner peripheral surface areas 5b. (Hence, Rp>Ri.) Alternatively, the two annular members 11 may be bonded to each other by the use of a bonding agent or the like to complete the cage 15.

For the resinous material that can be used to form the two annular members 11, a poly amide resin such as, for example, PA66 or PA46 and a poly phenyl sulfide resin can be suitably enumerated and, if required, reinforcement fibers such as, for example, glass fibers may be mixed therein.

The present invention is not always limited to the cage that is assembled by jointing the two annular members 11 as hereinbefore described, and can be equally applicable to a machined cage of a kind which is formed by grinding a steel material to a predetermined shape and, also, to a molded cage formed integrally by a resinous material.

Figure 7:
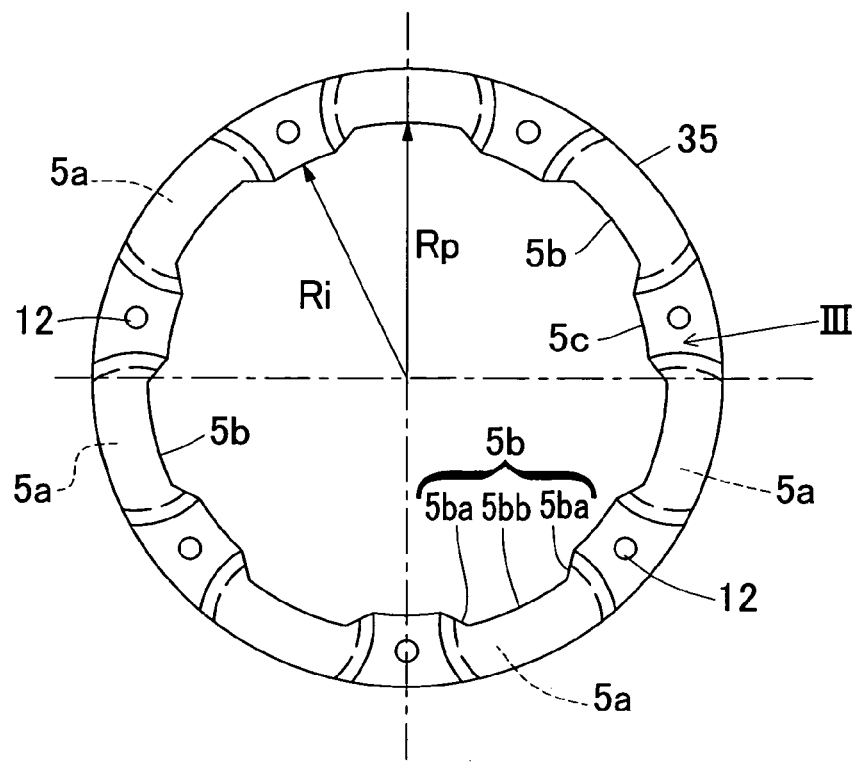
FIG. 7 is a front elevational view showing the cage according to a different preferred embodiment of the present invention.

FIG. 7 illustrates another preferred embodiment of the present invention. The cage now identified by 35 is of a design, in which each of the outwardly concaved inner peripheral surface areas 5b in alignment with the respective pocket 5a, when viewed from a direction parallel to the longitudinal axis of the ball bearing assembly, represents a polygonal shape. More specifically, each of the outwardly concaved inner peripheral surface areas 5b represents a generally trapezoidal shape having a pair of inclined surfaces 5ba, each inclined radially outwardly from a radially inwardly convexed inner peripheral surface area 5c situated between the neighboring pockets 5a, and a constant diametric surface 5bb having opposite sides continued from the respective inclined surfaces 5ba and also having a constant inner diameter. Even this cage 35 has its inner peripheral surface corrugated, in a manner substantially similar to the previously described cages 5 and 15, with each inner peripheral surface area 5b so inclined as to be concaved radially outwardly, in which the radius Rp measured from the geometric center of the bore of the cage 35 to each of the outwardly concaved inner peripheral surface areas 5b in alignment with the respective pocket 5a is chosen to be greater than the radius Ri measured from the geometric center of the bore of the cage 35 to each of the radially inwardly convexed inner peripheral surface areas which lies intermediate between the neighboring concaved inner peripheral surface areas 5b and, hence, (Rp>Ri).

Even with the cage in which each of the inner peripheral surface areas 5b is so shaped as to represent the polygonal shape when viewed from the direction parallel to the longitudinal axis of the ball bearing assembly, any reduction in strength of the cage as a whole does not occur and an undesirable leakage of the grease from the inner race sealing grooves 2a of the bearing assembly 1, which would occur when such cage is incorporated in the bearing assembly as shown in FIG. 1, can be avoided, in a manner similar to those afforded by any one of the previously described cages 5 and 15.

It is to be noted that where each of the inner peripheral surface areas 5b aligned with the respective pockets 5a is so shaped as to represent the polygonal shape having a plurality of angled portions, the number of those angled portions so formed may not be specifically limited. Also, each of the inner peripheral surface areas 5b may represent an asymmetrical shape relative to the linear line extending in a radial direction.

In addition, each of the inner peripheral surface areas 5b aligned with the respective pockets 5a may be of a shape corresponding to a combination of a plane and a curved surfaces.

In summary, the present invention is applied to any cages which satisfy the requirement that the radius measured from the geometric center of the bore of the cage to an inner peripheral surface area aligned with each of the pockets defined in such cage is greater than the radius measured from the geometric center of the bore of the cage to a different inner peripheral surface area intermediate between the neighboring pockets.

What is claimed is:

1. A ring-shaped cage for use in a ball bearing assembly, the cage comprising:
   a circumferentially extending body forming a bore defined therein and having inner and outer peripheral surfaces opposite to each other,
   the circumferentially extending body having a plurality of pockets defined therein to hold a corresponding number of balls,
   the radius of the bore measured from the geometric center of the bore to an outer peripheral surface area of the circumferentially extending body is uniform, and
   the radius of the bore measured from the geometric center of the bore to a whole inner peripheral surface area of the circumferentially extending body aligned with each of the pockets being greater than the radius measured from the geometric center of the bore to a different whole inner peripheral surface area of the circumferentially extending body intermediate the neighboring pockets so that recessed portions are formed in the inner peripheral surface extending the whole length of the pockets in the circumferential direction, respectively.

2. The cage for the ball bearing assembly as claimed in claim 1, wherein the inner peripheral surface area of the circumferentially extending body aligned with each of the pockets is of a curved shape representing a concave line when viewed from an axial direction.

3. The cage for the ball bearing assembly as claimed in claim 1, wherein the inner peripheral surface area of the circumferentially extending body aligned with each of the pockets is of a partial polygonal shape having a plurality of angled portions when viewed from an axial direction.

4. The cage for the ball bearing assembly as claimed in claim 1, wherein the inner peripheral surface area of the circumferentially extending body aligned with each of the pockets is inclined.

5. The cage for the ball bearing assembly as claimed in claim 1, wherein the circumferentially extending body comprises two annular members coaxially joinable together in an axial direction,
   each of the annular members comprise a plurality of pocket defining wall areas of a substantially semicircular configuration that define respective parts of the pockets and are spaced a predetermined distance from each other in a direction circumferentially thereof, and generally flat bridge areas alternating with the pocket defining wall areas and each connecting the neighboring pocket defining wall areas together, and
   the annular members being jointed together with the bridge areas of the annular members and being connected together in overlapped relation to each other.

6. The cage for the ball bearing assembly as claimed in claim 5, wherein each of the annular members is made of a resinous material.

7. The cage for the ball bearing assembly as claimed in claim 5, wherein each of the annular members is prepared from a steel plate.

8. A ball bearing assembly comprising:
an inner ring; an outer ring; a plurality of balls interposed between the inner ring and the outer ring; annular sealing plates to close opposite open ends of an annular bearing space delimited between the inner ring and outer ring; and the cage as claimed in claim 1,
the balls are disposed in the annular space and a lubricant grease is filled within the annular space.

9. A ball bearing assembly comprising:
the cage as claimed in claim 1; and a stationary inner ring and a rotational outer ring between which the cage is disposed.

10. A ring-shaped cage for use in a ball bearing assembly, the cage comprising:
a circumferentially extending body forming a bore defined therein and having inner and outer peripheral surfaces opposite to each other,
the circumferentially extending body having a plurality of pockets defined therein to hold a corresponding number of balls,
the radius of the bore measured from the geometric center of the bore to a whole inner peripheral surface area of the circumferentially extending body aligned with each of the pockets being greater than the radius measured from the geometric center of the bore to a different whole inner peripheral surface area of the circumferentially extending body intermediate the neighboring pockets,
wherein the whole inner peripheral surface area of the circumferentially extending body aligned with each of the pockets is of a curved shape representing an arcuate surface such that a circumferentially intermediate portion thereof has a radius larger than the rest of surface area so that recessed portions are formed in the inner peripheral surface extending the whole length of the pockets in the circumferential direction, respectively.

11. A ball bearing assembly comprising:
an inner ring; an outer ring; a plurality of balls interposed between the inner ring and the outer ring; annular sealing plates to close opposite open ends of an annular bearing space delimited between the inner ring and outer ring; and the cage as claimed in claim 10,
the balls are disposed in the annular space and a lubricant grease is filled within the annular space.

12. A ball bearing assembly comprising:
the cage as claimed in claim 10; and a stationary inner ring and a rotational outer ring between which the cage is disposed.

* * * * *

UNITED STATES PATENT AND TRADEMARK OFFICE
CERTIFICATE OF CORRECTION

PATENT NO. : 7,988,365 B2  
APPLICATION NO. : 12/224801  
DATED : August 2, 2011  
INVENTOR(S) : Norihide Sato et al.

Page 1 of 1

It is certified that error appears in the above-identified patent and that said Letters Patent is hereby corrected as shown below:

First Page Column 2 (Other Publications), Line 3-4, Delete "Chinese Office Action issued in corresponding Chinese Patent Application 200780008244.2." immediately after "PCT/JP2007/000092" and insert the same directly below "PCT/JP2007/000092." as a new separate line entry.

Column 10, Line 9, In Claim 10, after "rest of" insert --the whole inner peripheral--.

Signed and Sealed this  
Twenty-fifth Day of October, 2011

David J. Kappos  
*Director of the United States Patent and Trademark Office*